United States Patent
Mosciatti et al.

(12) 
(10) Patent No.: US 6,201,321 B1
(45) Date of Patent: Mar. 13, 2001

(54) APPARATUS AND METHOD FOR DISSIPATING HEAT FROM A MOTOR

(75) Inventors: Roger Mosciatti, Coram; Robert Medina, Selden, both of NY (US)

(73) Assignee: Bayside Controls, Inc., Port Washington, NY (US)

( * ) Notice: Subject to any disclaimer, the term of this patent is extended or adjusted under 35 U.S.C. 154(b) by 0 days.

(21) Appl. No.: 09/397,092

(22) Filed: Sep. 16, 1999

Related U.S. Application Data

(63) Continuation-in-part of application No. 09/090,939, filed on Jun. 5, 1998, now Pat. No. 5,959,384.

(51) Int. Cl.[7] ................................................. H02K 1/04
(52) U.S. Cl. ................................ 310/43; 310/64; 310/89; 29/596
(58) Field of Search .......................... 310/64, 43, 87, 310/89; 29/596

(56) References Cited

U.S. PATENT DOCUMENTS

| | | | |
|---|---|---|---|
| 3,719,436 | * | 3/1973 | McFarlin .............................. 417/356 |
| 3,742,595 | * | 7/1973 | Lykes ..................................... 29/596 |
| 3,758,799 | * | 9/1973 | Dochterman et al. .................. 310/89 |
| 4,128,527 | * | 12/1978 | Kinjo et al. ............................. 310/43 |
| 4,387,311 | * | 6/1983 | Kobayashi et al. .................... 310/43 |
| 4,624,884 | * | 11/1986 | Harada et al. ........................ 428/218 |
| 4,963,776 | * | 10/1990 | Kitamura ............................... 310/64 |
| 5,459,190 | * | 10/1995 | Nakamura et al. .................. 524/443 |
| 5,532,533 | * | 7/1996 | Mizutani ............................ 310/68 B |

* cited by examiner

*Primary Examiner*—Elvin Enad
*Assistant Examiner*—Joseph Waks
(74) *Attorney, Agent, or Firm*—Venable

(57) ABSTRACT

Heat-conductive masses of material encapsulate end turns of a stator fixed in a housing of a motor to dissipate heat from the stator through the side and one end of the housing. In one embodiment, a resilient heat-conductive pad is interposed between a front plate of the housing and a side of one of the heat-conductive masses of material facing the front plate. The pad has a thickness greater than the manufacturing tolerances associated with assembling an end of the stator at an end of the housing adjacent to the front plate. In another embodiment, the heat-conductive mass of material adjacent to the front plate extends into contact with the front plate. The contact can be assured, even without the presence of a resilient pad, by forming the heat-conductive mass between the stator and the front plate after the stator is assembled to the housing.

11 Claims, 1 Drawing Sheet

APPARATUS AND METHOD FOR DISSIPATING HEAT FROM A MOTOR

CROSS REFERENCE TO RELATED APPLICATION

This is a continuation-in-part of Serial No. 09/090,939 filed on Jun. 5, 1998, now U.S. Pat. No. 5,959,384 published on Sep. 28, 1999.

BACKGROUND OF THE INVENTION

This invention relates to an apparatus and method for improved dissipation of heat from an electric motor, especially a brushless motor.

SUMMARY OF THE INVENTION

By the present invention, heat is dissipated from an electric motor by heat-conductive masses of material encapsulating end turns of a stator fixed in a housing of the motor. Heat is also dissipated from the stator through one of the heat-conductive masses of material to an element of the housing, such as a front plate, extending across one of the ends of the stator toward a shaft of the motor.

In one embodiment, a resilient heat-conductive pad is interposed between the element of the housing and a side of one of the heat-conductive masses of material facing the element of the housing. The resilient heat-conductive pad has a thickness greater than the manufacturing tolerances associated with assembling an end of the stator at an end of a main portion of the housing adjacent to the element.

In another embodiment, the heat-conductive mass of material adjacent to the element of the housing extends into contact with the element. The contact can be assured, even without the presence of a resilient pad, by forming the heat-conductive mass between the stator and the element of the housing after the stator is assembled to the housing. More specifically, a heat-conductive material in liquid form is made to flow into a space around the end turns and into any gap between the housing elements and the end turns to fill the space and the end turns to fill the space and the gap, after which the liquid material is cured.

BRIEF DESCRIPTION OF THE DRAWINGS

The foregoing and other objects, aspects and advantages will be better understood from the following detailed description of preferred embodiments of the invention, in which.

DETAILED DESCRIPTION OF THE PREFERRED EMBODIMENTS

Figure 1:
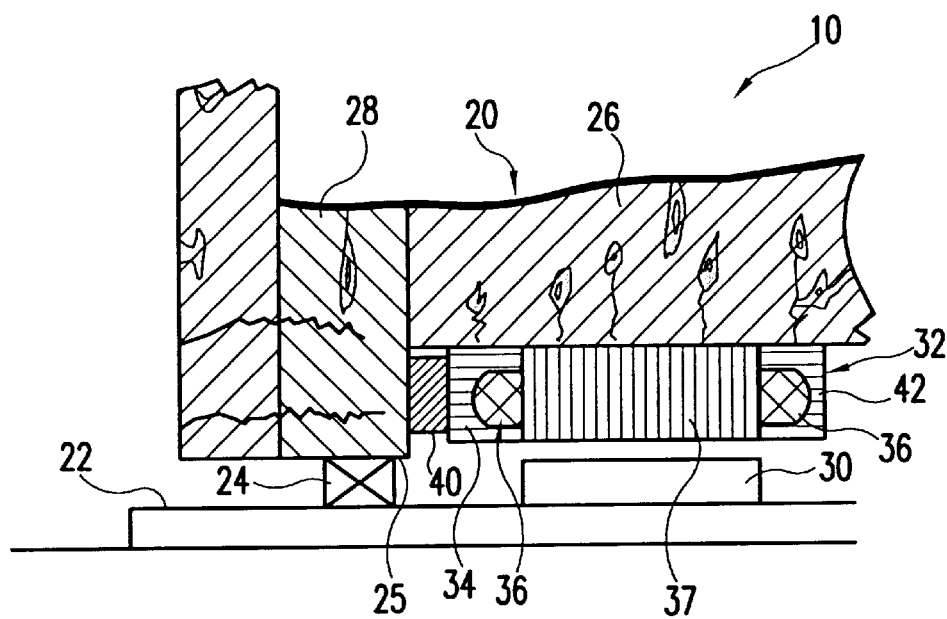
FIG. 1 is a partial sectional view of a portion of a brushless motor assembly showing a first embodiment of heat dissipating arrangement according to the present invention.

As can be seen from FIG. 1, a brushless motor, which is designated generally by the reference numeral 10, includes a motor housing 20, a drive shaft 22 extending from one end of the motor housing, the drive shaft being mounted for rotation in the housing by a bearing 24 positioned in an opening 25 of the housing. Typically, another bearing (not shown) is provided at an opposite end of the motor housing 20. The motor housing 20 includes a generally cylindrical main portion 26 and a front plate 28 defining the opening which receives the bearing 24.

A permanent magnet 30 is fixed to the drive shaft 22 of the motor 10, and a stator assembly 32 is fixed to an inside surface of the main portion 26 of the motor housing 20. FIG. 1 shows the use of a mass of heat conducting material, a "thermal bridge", 34 for removing heat from end turns 36 of the brushless motor 10. The stator assembly 32, which may be generally of a conventional design, has a plurality of coils on a spider 37, with the end turns 36 potted in a thermal resin to form the thermal bridge 34 which extends across a gap between the end turns 36 and the front plate 28 of the motor housing 20. Here it will be appreciated that the length of the potted thermal bridge 34 will depend upon the geometry of a particular brushless motor.

The material which defines the potted thermal bridge 34 comprises a curable plastic resin having a filler material, such as aluminum oxide, which is a good heat conductor. The material of the thermal bridge 34 encapsulates the end turns 36 of the stator assembly 32 and has one side in contact over substantially its entire surface with the interior surface of the main portion 26 of the motor housing 20. The thermal bridge 34 has another surface facing the front plate 28 of the motor housing 20 or other structure of the housing which extends radially toward the motor shaft 22.

Because of practical limitations on production tolerances, the nominal length of the thermal bridge 34 is necessarily shorter than the nominal length of the gap. A compressible, resilient pad 40 of a heat conducting material is inserted between the end of the thermal bridge 34 and the front plate 28. A suitable pad, which is commercially available under the trademark Gap Pad from the Bergquist Company of Minneapolis, Minn., is made of a highly conformable silicone polymer filled with alumina.

Due to the manufacturing tolerances described above, the side of the thermal bridge 34 facing the front plate 28 of the motor housing 20 might not be in contact with the motor housing. Without such contact, an opportunity for additional heat dissipation from the motor is lost. The manufacturing tolerances in placing the thermal bridge in contact with the front plate of the motor housing are about plus or minus 0.010 inches. In order to assure heat conduction from the thermal bridge 34 to the front plate 28 despite the tolerances, the compressible, resilient pad 40 has a thickness in an uncompressed state of greater than 0.020 inches, which assures that the pad will always be in contact with both the thermal bridge and the front plate, despite the manufacturing tolerances. The compressible resilient pad 40 is placed in contact with the thermal bridge 34 after the stator assembly 32 is fixed to the main portion 26 of the motor housing 20. Then, the front plate 28 is fixed to the main portion 26, thereby compressing the pad 40. Therefore, heat will be dissipated from the stator assembly 30 by being conducted from the thermal bridge 34 through the compressible, resilient pad 40 to the front plate 28. The pad 40 has a surface facing the thermal bridge 34 whose area is equal to at least most of the area of the facing surface of the thermal bridge, the surface of the pad being in contact with the thermal bridge over the entire area of the surface of the pad. It can be appreciated that the stator assembly 32, the thermal bridge 34 and the compressible pad 40 are all annular in shape, extending around the entire interior perimeter of the motor housing 20. The motor housing 20 is made of a heat conductive material, such as steel, and sometimes has formations such as fins, to transfer heat to the ambient air.

A thermal bridge 42 is also provided around the end turns 36 at the opposite end of the stator assembly 32, the bridge 42 having a surface in contact with the interior surface of the main portion 26 of the motor housing 20 for additional heat transfer.

Figure 2:
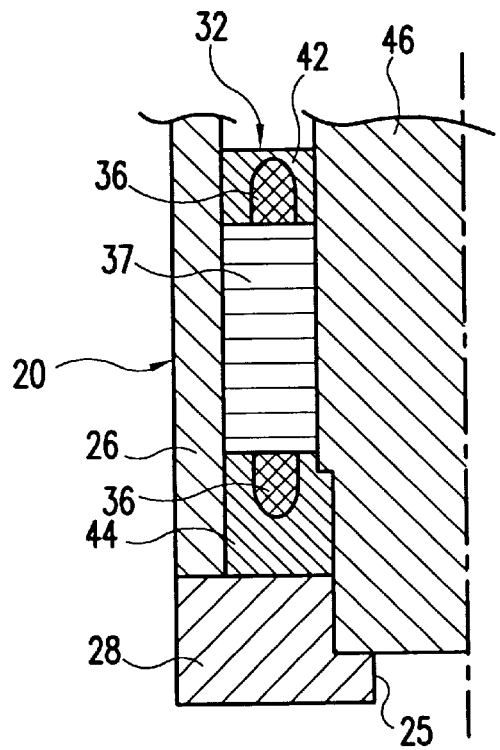
FIG. 2 is a partial sectional view of a portion of a brushless motor assembly showing a second embodiment of heat dissipating arrangement according to the present invention.

As can be appreciated from FIG. 2, which represents a second embodiment of the present invention, there is heat transferring contact between a thermal bridge 44 and the front plate 28 of the housing 20 without a heat conducting resilient pad. Such heat conducting contact can be assured even without a pad by forming the thermal bridge 44 with the stator assembly 32 already fixed in position in the motor housing. In order to accomplish this, a plug 46 is inserted in an assembly of the main portion 26 of the housing 20, the front plate 28 of the housing and the stator assembly 32. The plug 46 defines with such an assembly an annular cavity for receiving the resin in a flowable liquid form, prior to the curing of the resin. Axial passages are present in the stator assembly 32 by which the resin can be made to flow by conventional means into the cavity adjacent to the front plate 28 of the motor 10. The resin can be filled until it extends slightly above the end turns 36 of the stator assembly 32 at the end remote from the front plate 28 of the motor 10. Then, the resin can be cured and the plug 40 removed.

While the invention has been described in terms of certain preferred embodiments, those skilled in the art will recognize that the invention can be practiced with modification within the spirit and scope of the appended claims.

What is claimed is:

1. An arrangement for dissipation of heat from an electric motor having a shaft, a housing and a stator mounted in the housing, the stator having opposite ends, comprising:

the housing extending across one of the ends of the stator toward the shaft, said one end of the stator being encapsulated in a mass of material; and a resilient pad extending between and contacting the housing and said mass of material, wherein said mass and said resilient pad are made of heat conductive materials.

2. The arrangement of claim 1, wherein said ends of the stator have end turns, the end turns at said one end of the stator being encapsulated in the mass of material.

3. The arrangement of claim 2, wherein said mass of material has a side in contact with the housing of the motor.

4. The arrangement of claim 2, wherein the end turns at an opposite end of the stator are encapsulated in a mass of heat conductive material having a side in contact with the housing of the motor.

5. The arrangement of claim 1, wherein the material of the mass of material is a cured plastic resin.

6. The arrangement of claim 1, wherein the resilient pad is made of a silicone polymer filled with alumina.

7. The arrangement of claim 1, wherein the dimension of the resilient pad from said one end of the stator to said element of the housing is greater than the dimensional tolerances involved in assembling the stator in the housing.

8. The arrangement of claim 1, wherein the mass of material, the element of the housing and the resilient pad are annular in shape.

9. The arrangement of claim 1, wherein said mass of material has a side contacting the resilient pad, and the resilient pad has a side contacting the mass of material, the contacting sides of the mass and the resilient pad being in contact with one another over most of the areas of each of the contacting sides.

10. The arrangement of claim 9, wherein the mass of material, the element of the housing and the resilient pad are annular in shape.

11. A method of making an electric motor having a shaft, a housing and a stator mounted in the housing, the stator having opposite ends, comprising:

providing the housing that extends toward the shaft;

positioning a resilient pad made of a heat conducting material in heat transferring contact with said housing;

encapsulating one of the ends of the stator in a mass of heat conducting material; and securing the stator in the housing, with the mass of heat conducting material in heat transferring contact with said resilient pad in order to dissipate heat from the stator.

* * * * *